(12) United States Patent
Elterman et al.

(10) Patent No.: US 7,704,007 B2
(45) Date of Patent: Apr. 27, 2010

(54) DUST BOOT WITH GREASE CHANNEL

(75) Inventors: James Elterman, St. Louis, MO (US); Alexander Karpman, Ballwin, MO (US); Donald Doherty, St. Peters, MO (US); Thomas Byrnes, St. Charles, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 93 days.

(21) Appl. No.: 11/510,326

(22) Filed: Aug. 25, 2006

(65) Prior Publication Data

US 2007/0059092 A1 Mar. 15, 2007

Related U.S. Application Data

(60) Provisional application No. 60/711,366, filed on Aug. 25, 2005.

(51) Int. Cl.
*F16C 11/00* (2006.01)
(52) U.S. Cl. .......................... 403/134; 403/50; 277/635
(58) Field of Classification Search ................ 277/634, 277/365, 636, 928, 635; 403/50, 51, 134, 403/288
See application file for complete search history.

(56) References Cited

U.S. PATENT DOCUMENTS

| | | | |
|---|---|---|---|
| 2,559,857 A | 7/1951 | Edwards | |
| 3,208,290 A * | 9/1965 | Mathues et al. | 403/134 |
| 3,208,779 A | 9/1965 | Sullivan, Jr. | |
| 3,248,955 A | 5/1966 | Templeton | |
| 3,279,834 A | 10/1966 | Budzynski | |
| 3,391,952 A | 7/1968 | Zeigler | |
| 3,451,700 A | 6/1969 | Smith | |
| 3,476,417 A | 11/1969 | Born et al. | |
| 3,596,915 A | 8/1971 | Snidar | |
| 4,154,546 A | 5/1979 | Merrick et al. | |
| 4,567,973 A | 2/1986 | Butz | |
| 5,046,745 A | 9/1991 | Sweetland et al. | |

(Continued)

FOREIGN PATENT DOCUMENTS

JP 03074625 * 3/1991

*Primary Examiner*—Michael P Ferguson
(74) *Attorney, Agent, or Firm*—Robert L. Stearns; Dickinson Wright, PLLC

(57) ABSTRACT

A dust boot with enhanced protection from contaminants and improved lubrication characteristic includes a dust boot body having a housing opening on one end and on an opposing end a stud opening in an upper boot wall. The boot also includes a wiping lip located on an inner face of the upper boot wall in the stud opening, a grease channel on an outer surface of the upper boot wall bounded circumferentially by a rim seal, an offset opening hole through the upper boot wall into the grease channel which is offset from the wiping lip, and a flexible flap portion of said rim seal which is spaced away from said offset opening hole. The dust boot may also include an insert made from a plastic such as nylon housed in the upper boot wall such that the offset opening hole extends through the insert. The insert may also form a portion of the grease channel. The offset opening is preferably spaced opposite the flexible flap to promote the flow of grease around the outer surface of the stud. The dust boot may be incorporated into a joint assembly by placing it in sealing engagement with a housing which holds a stud in articulating engagement.

20 Claims, 5 Drawing Sheets

U.S. PATENT DOCUMENTS

| | | | |
|---|---|---|---|
| 5,312,200 A * | 5/1994 | Buhl et al. | 403/134 |
| 5,316,317 A | 5/1994 | Fedorovich et al. | |
| 5,466,084 A | 11/1995 | Brueggen et al. | |
| 5,568,930 A | 10/1996 | Urbach | |
| 5,735,530 A | 4/1998 | Merkin et al. | |
| 6,164,657 A | 12/2000 | Merkin et al. | |
| 6,308,959 B1 | 10/2001 | Sokolihs et al. | |
| 6,582,146 B2 | 6/2003 | Raymoure | |
| 7,115,036 B2 * | 10/2006 | Masuda | 277/928 |

* cited by examiner

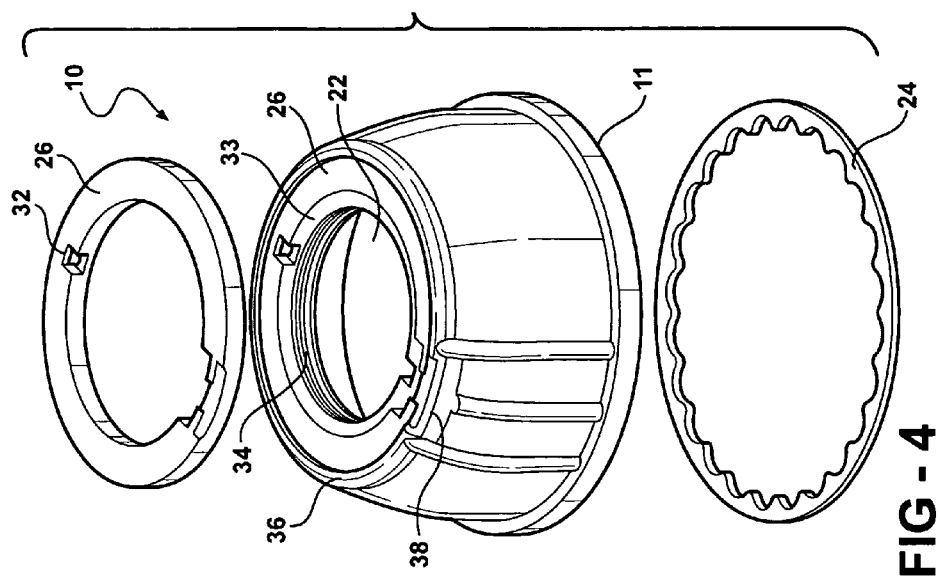
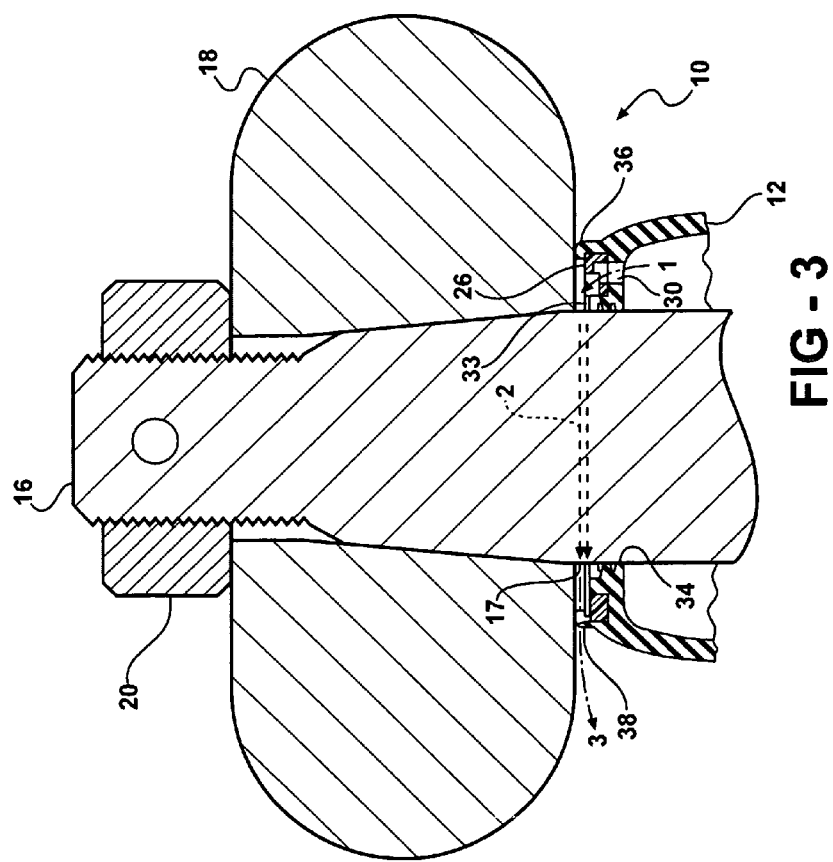

DUST BOOT WITH GREASE CHANNEL

CROSS-REFERENCES TO RELATED APPLICATIONS

This patent application claims priority to U.S. Provisional Patent Application Ser. No. 60/711,366, filed Aug. 25, 2005, which is incorporated herein by reference in its entirety.

BACKGROUND OF THE INVENTION

1. Field of the Invention

This invention relates to a boot type seal, especially adapted for ball and socket type joints, although useful in any installation for sealing relatively articulatable, tiltable or rotatable members while automatically venting or relieving excess pressures such as might be developed by high pressure lubrication or by the accumulation of excessive amounts of lubricants.

2. Related Art

Nearly all original chassis equipment, such as ball joints and tie rod ends, are sealed units. These "lube-for-life" parts are low maintenance since they are sealed, but generally do not have the life of a "greaseable" part. A greaseable part may be greased periodically to replace grease which has escaped or broken down during use, thereby flushing old grease, debris associated with wear of the joint parts or other contaminants (e.g., moisture, dirt or the like) from the joint in the process. Greasable parts offer reduced friction and increase the service life versus a lube-for-life part. Accordingly, greaseable parts are preferred for many applications.

The challenge in designing a dust boot for a greaseable part is that the dust boot must serve as a barrier to prevent contaminants from entering the articulating component. The dust boot must also allow existing grease to escape when the repair technician flushes the part with new grease.

Typical prior art dust boots for these applications utilize a small grease passage and a flexible flap on an outer rim seal to seal the part from contamination while allowing the grease to escape. Often, the annular dynamic wiping lip seals which surround the ball joint stud are interrupted with a bypass flap as well. This bypass flap represents a possible weak spot in the defense against contaminant infiltration, especially given its open relationship alongside the moving surface of the stud. Contaminants which manages to infiltrate the outermost flap can also get drawn through the inner bypass flap as the surface of the stud slides through the wiping lip seals.

The problem, therefore, with prior designs is that sealing capabilities may be compromised in order to ensure that the boot will also be able to allow grease to exit from the dust boot in a controlled manner. Accordingly, there is a need for an improved dust boot design that does not compromise the sealing capability from contaminants while also allowing the dust boot to purge grease during maintenance operations. Furthermore, there is a need for the stud opening of a dust boot to be lubricated as grease exits the dust boot which is not accomplished by prior designs.

SUMMARY OF THE INVENTION

A dust boot with enhanced protection from contaminants and improved lubrication characteristic includes a dust boot body having a housing opening on one end and on an opposing end a stud opening in an upper boot wall. The boot also includes a wiping lip located on an inner face of the upper boot wall in the stud opening, a grease channel on an outer surface of the upper boot wall bounded circumferentially by a rim seal, an offset opening hole through the upper boot wall into the grease channel which is offset from the wiping lip, and a flexible flap portion of the rim seal which is spaced away from the offset opening hole.

In another aspect, the dust boot may also include an insert made from a plastic such as nylon housed in the upper boot wall such that the offset opening hole extends through the insert.

In yet another aspect, the insert may also be housed in the upper boot wall so as to form a portion of the grease channel.

In yet another aspect, the offset opening is preferably spaced opposite the flexible flap to promote the flow of grease around the outer surface of the stud.

In yet another aspect, the dust boot may be incorporated into a joint assembly by placing it in sealing engagement with a housing which holds a stud in articulating, tilting or rotating (i.e., movable) engagement.

The subject dust boot design advantageously improves greaseability and lubrication by the use of an offset hole combined with a unique circumferential grease channel. The improved design evacuates grease through an offset hole that is spaced from the stud opening. The grease is then directed through a grease channel around the small, or stud exit end, of the dust boot toward a flap where the grease exists.

Evacuating the grease through the offset hole, instead of along the moving surface of the stud, significantly reduces the chance of contamination entering the socket of the part. If contamination does get beyond the flap, it is unlikely that it will continue through the grease channel and into the offset hole. Therefore, advantageously, the risk of contamination is reduced.

The grease channel around the stud opening advantageously serves two purposes during lubrication. As the part is lubricated, grease flows around the top of the dust boot. This lubricates the interface between the dust boot and the control arm (or spindle or other suspension member). Secondly, during lubrication, the grease also flows around the stud exit end of the dust boot. This lubricates the metal-to-rubber interface between the stud and the dust boot. Any contaminant which may have penetrated the seal and deposits in the grease passage or grease channel will be flushed out during the next lubrication.

BRIEF DESCRIPTION OF THE DRAWINGS

These and other features and advantages of the present invention will become more readily appreciated when considered in connection with the following detailed description and appended drawings, and wherein like numerals indicate like or corresponding parts throughout the several views:

FIG. 3 is a cross-sectional view showing a dust boot according to the subject invention installed over a stud with a control arm affixed in a operative position to the stud;

FIG. 4 is an exploded perspective view of a dust boot according to the subject invention;

DETAILED DESCRIPTION OF THE PREFERRED EMBODIMENT

Figure 2:
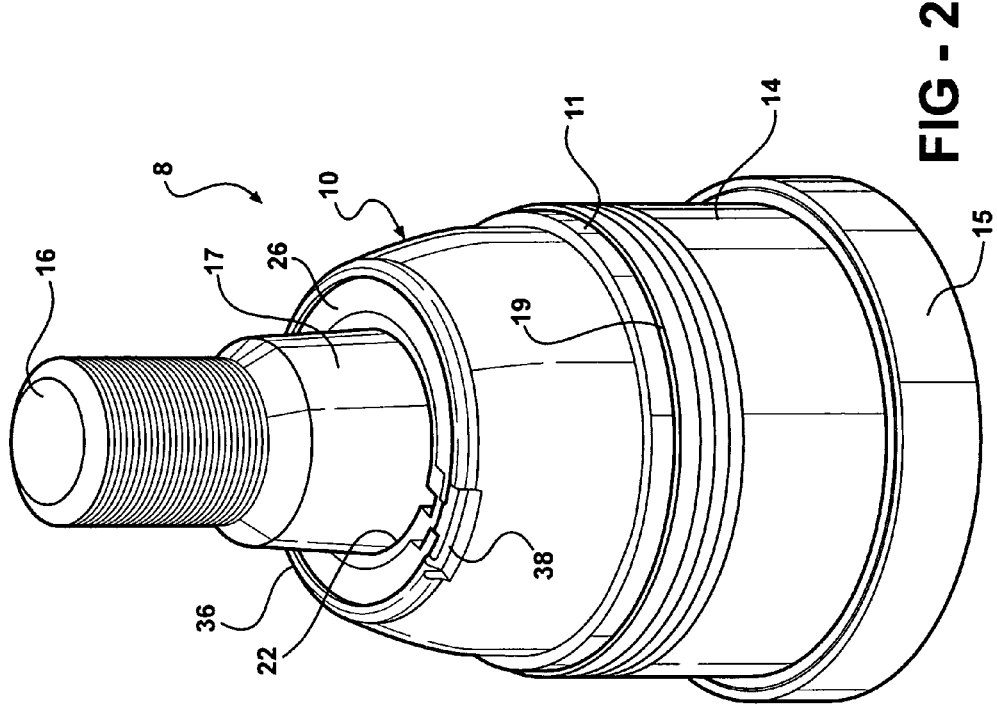
FIG. 2 is a perspective view of the dust boot assembled for operation in a joint assembly.
Figure 1:
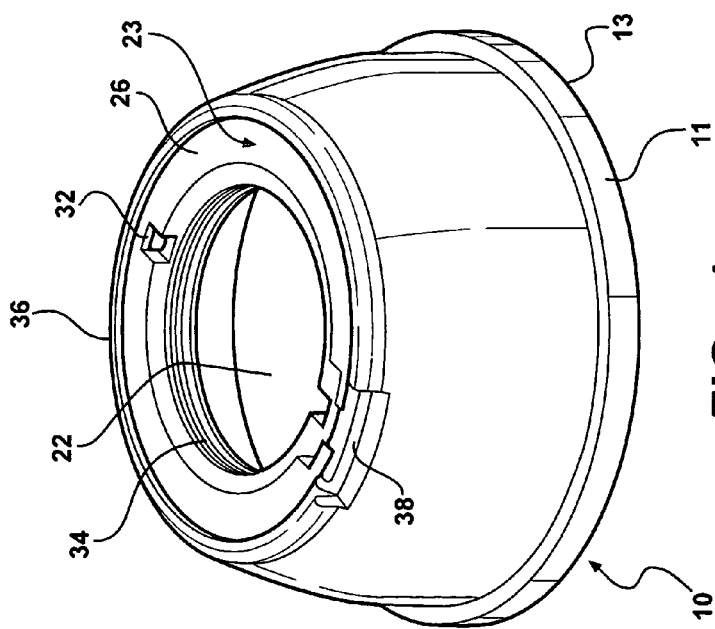
FIG. 1 is a perspective view of a dust boot according to the subject invention.

Referring to FIGS. 1-8C, a dust boot according to the subject invention is generally shown at 10 in FIGS. 1 and 2. A dust boot 10 is a highly resilient device typically molded into the shape of a dome or convolute. The dust boot may have other shape configurations instead of domed, including many variations of a stepped or capped cylinder, accordion-like folds or other well-known shapes. Dust Boot 10 is generally formed from an elastomer, such as natural or synthetic rubber and the like, or various plastics. A material is chosen having inherent resiliency tending to reclaim its original molded shape upon deformation although accommodating such deformation without appreciable resistance.

The body of the dust boot 10, in this example possessing a domed shape, includes a large opening 12 or housing opening 12 on a housing end 13 having a lip 11 or other feature adapted to fit tightly against the stud exit end 19 of a joint housing 14. The large opening 12 and lip 11 of the dust boot 10 can be reinforced with a rigid ring 24 shown best in FIGS. 4 and 6. The rigid ring can be made from any rigid material, including a metal such as zinc or cadmium plated steel, or various rigid plastics. A stud 16, such as a stud having a bearing portion for engagement of a corresponding socket in the housing and a shank portion adapted for attachment of the stud, extends from the housing 14 for connecting to a control arm 18, spindle or other feature. A nut 20, as shown in FIG. 3, threads onto the end of stud 16 to hold the control arm 18 (or other suspension component) securely on a tapered fitting of the stud 16. The dust boot 10, housing 14 and articulated stud 16 comprise joint assembly 8.

Figure 7C:
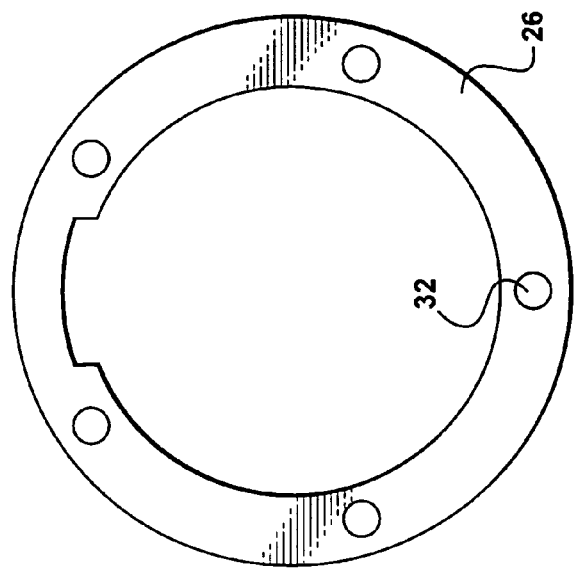
FIGS. 7A through 7C represent front, cross-sectional and rear views of the nylon insert according to the subject invention.
Figure 7B:
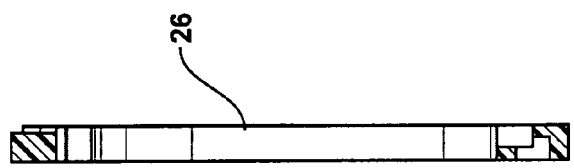
Figure 7A:
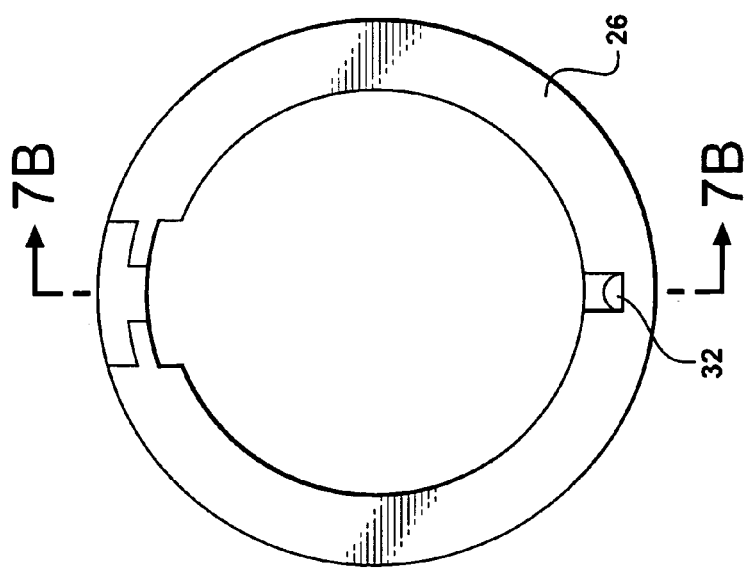

The opposite end of the dust boot body 10 has a smaller diameter opening 22 or stud opening 22 and an adjacent upper boot wall 23 in which is disposed an insert 26, preferably a rigid insert. Preferably, the insert is formed from plastic, such as one of a number of types of nylon. The insert 26, which is shown in detail in FIGS. 7A through 7C, is fitted into a retaining channel 28 molded into the body of the dust boot 10 and serves to add rigidity to the small end of the dust boot 10. Other stiffening or reinforcing techniques may also be possible so that the use of a separate insert 26 per se can be optional. For example, the dust boot body 10 and insert 26 may be co-molded in the same mold using different materials and/or processing techniques.

The dust boot 10 is formed with chaplet holes 30, one of which aligns with an offset inlet opening 32 in the back side of the insert 26. When the joint assembly 8 (FIG. 2) is greased, typically through a grease fitting (not shown) located on the base end 15 of housing 14, lubricant in excess of the amount needed to fill the joint housing 8 exits the joint per se and proceeds into the interior of the dust boot 10 where it surrounds the enclosed portion of the stud 16. Pressure resulting from continued introduction of grease into the dust boot 10 forces grease into the chaplet pin hole 30, where it is routed into the offset inlet opening 32 of the insert 26 and from there into an annular grease channel 33 formed in the top, or outer, surface of the insert 26 where it flows around and lubricates the outer surface 17 of the tapered shank or stud portion of stud 16.

Figure 5:
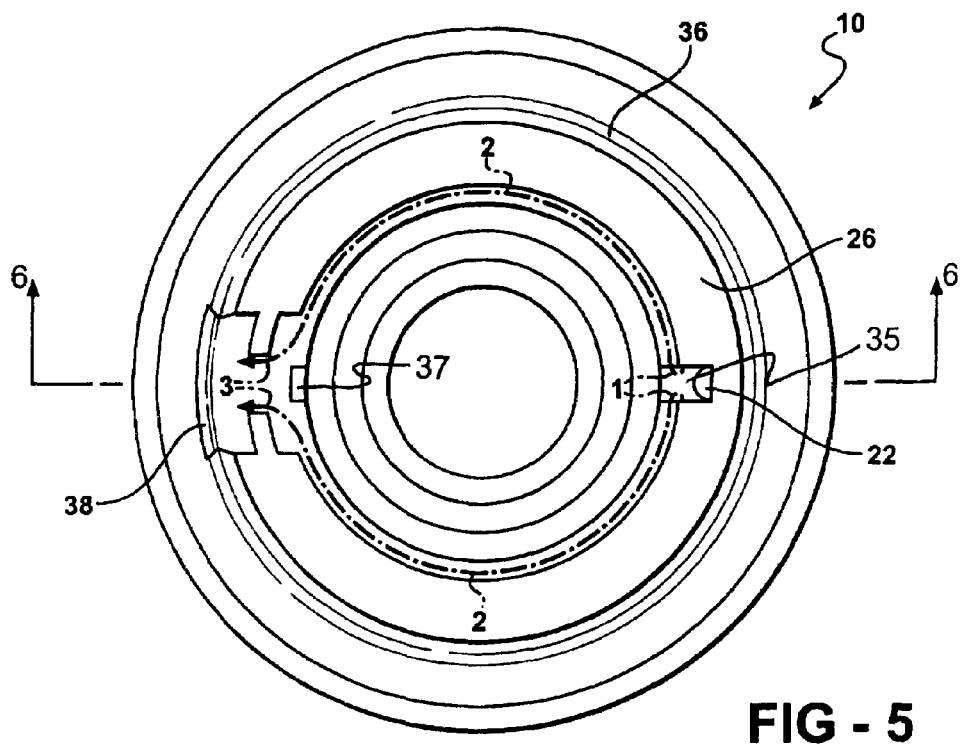
FIG. 5 is a top view of the subject dust boot.
Figure 6:
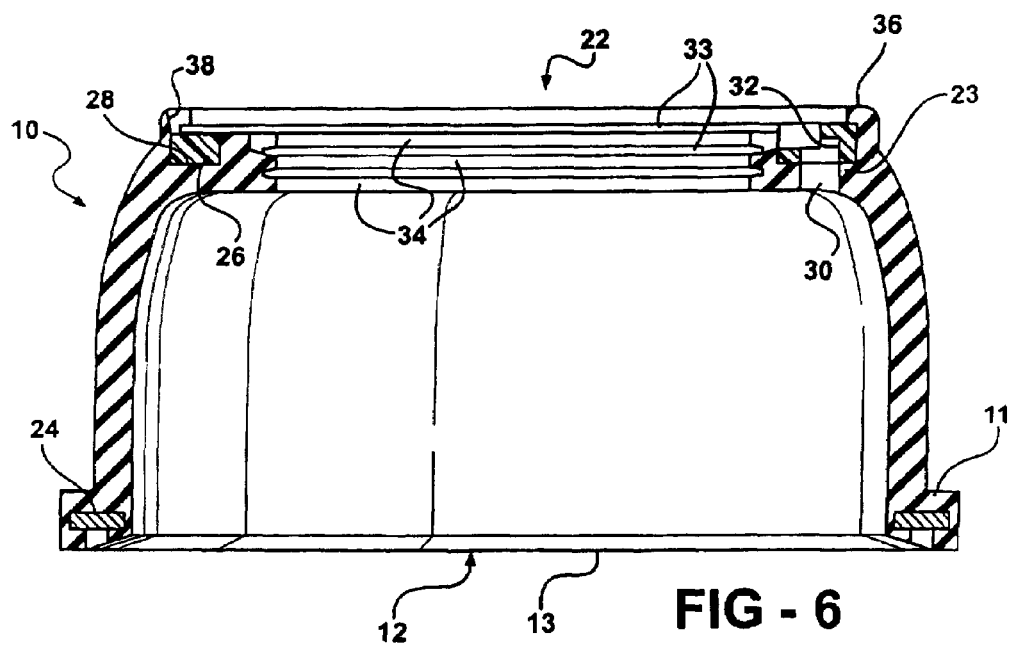
FIG. 6 is a cross-sectional view taken along line 6-6 in FIG. 5.

Wiping lips 34 form a dynamic seal between the outer surface 17 of the stud 16 and the flexible body of the dust boot 10. Referring to FIGS. 1, 5 and 6, continuous, annular wiping lips 34 are located on an inner face of the upper boot wall 23 in the stud opening 22. When the control arm 18 is secured in position on the stud 16, as shown in FIG. 3, the adjacent surface of the control arm 18 bears against an annular rim 36 of the dust boot 10, creating a seal therebetween. Excess grease pushed through the chaplet pin hole 30 and the inlet opening 32 of the insert 26 into the grease channel 33 is trapped below the control arm 18, and thus flows or otherwise migrates in the grease channel 33 in either semi-circular direction about the outer surface of the stud 16 toward the diametrically opposite end of the insert 26. Simultaneously, the tapered outer surface 17 of the stud 16, dust boot wing lip grooves, and bottom surface of the control arm 18 are lubricated. Referring again to FIGS. 1, 5 and 6, grease channel 33 may include a wiping lip groove located under a discontinuous uppermost wiping lip 34, which is discontinuous by virtue of inlet notch 35 and outlet notch 37.

A flexible flap 38 residing in the upper rim 36 is designed to yield under a sufficient pressure differential (i.e., at a lower pressure) to permit egress of the overflow lubricant from the assembly preferentially to other points along the upper rim 36 or other points of attachment of the housing opening 12. Thus, as shown in FIG. 3, under a pressure sufficient to promote flow, excess grease flows according to the arrows 1, 2, and 3 from the inner confines of the dust boot 10, through the chaplet pin hole 30, around the grease channel 33, which comprises in an upper portion the space between the outer surface of the upper boot wall and the control arm as well as in a lower portion the groove beneath uppermost wiper lip 34, and in passing through the grease channel 33 contacting and lubricating portions of the outer surface 17 of stud 16, and finally exits through the flexible flap 38.

By this design, grease is evacuated through an offset hole (30, 32) that is away from and not in touching contact with the outer surface 17 of stud 16, which significantly reduces the chance of external contaminants entering the socket between the housing 14 and the wear or bearing portion (not shown) on the end of the stud 16. If contamination does infiltrate beyond the flap 38, it is unlikely that it will continue through the grease channel 33, including either the upper and lower portions thereof, and into the offset inlet opening 32 because the sliding surface of the stud 16 does not scrape through the offset hole 32. Therefore, the risk of contamination is reduced. Also, it is not necessary to incorporate a flexible flap in the wiper lips 34 to permit lubrication of the outer surface 17 of stud 16 as in prior designs, because of the lubrication passage 33 provided as described above, thus greatly reducing or eliminating the possibility of introduction of external contaminants through a flexible flap portion of the wiping lips 34 which by design is less resistant (i.e., has a lower sealing force) than other portions of the wiping lips.

During lubrication, the grease flows around the entire outer stud exit end of the dust boot as bounded by the rim 36 and the control arm 18 thus filling the top of the dust boot 10 with grease. This lubricates the metal-to-rubber interface between the stud 16 and the dust boot 10. Any contaminants which may have penetrated the seal and reside in the grease passage or grease channel 33, including the groove of the wiping lip 34, will be flushed out during the next lubrication of the joint.

The number, size, orientation and location of chaplet pin holes 30 through which grease escapes from the dust boot 10 interior, the number of corresponding inlet openings 32, and the number of grease channels 33 and the geometry or profile of the channels 33 may vary to suit the scale of the dust boot 10 and other factors, such as the application environment. It is preferred, however, that the offset inlet opening 32 be spaced away from flexible flap 38 to promote flow of grease around the entire circumference of outer surface 17 of stud 16 which is adjacent to or over the travel span of grease channel 33, and even more preferred that it be located generally opposite flexible flap 38.

Figure 8C:
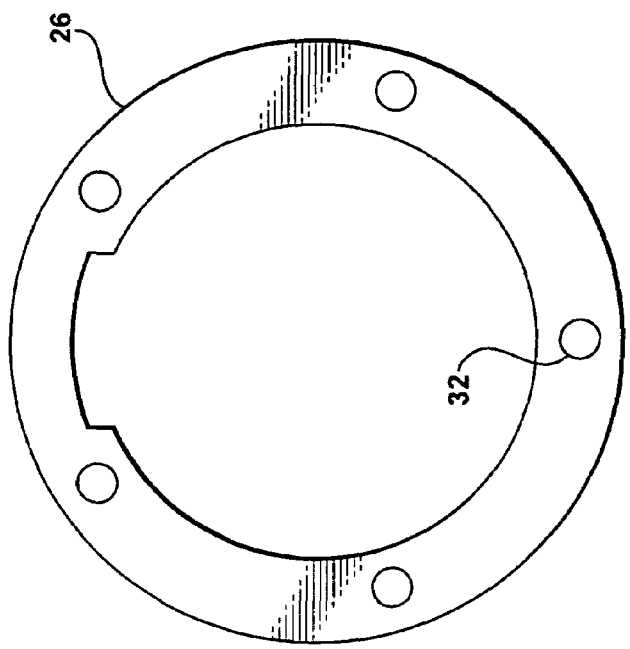
FIGS. 8A through 8C illustrate front, cross-sectional and rear views of an alternative design for the nylon insert.
Figure 8B:
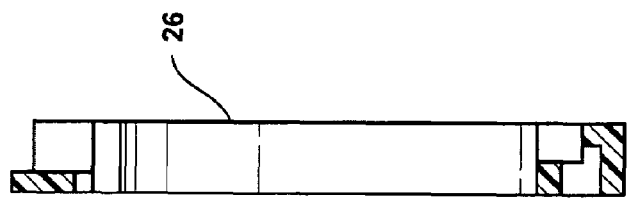
Figure 8A:
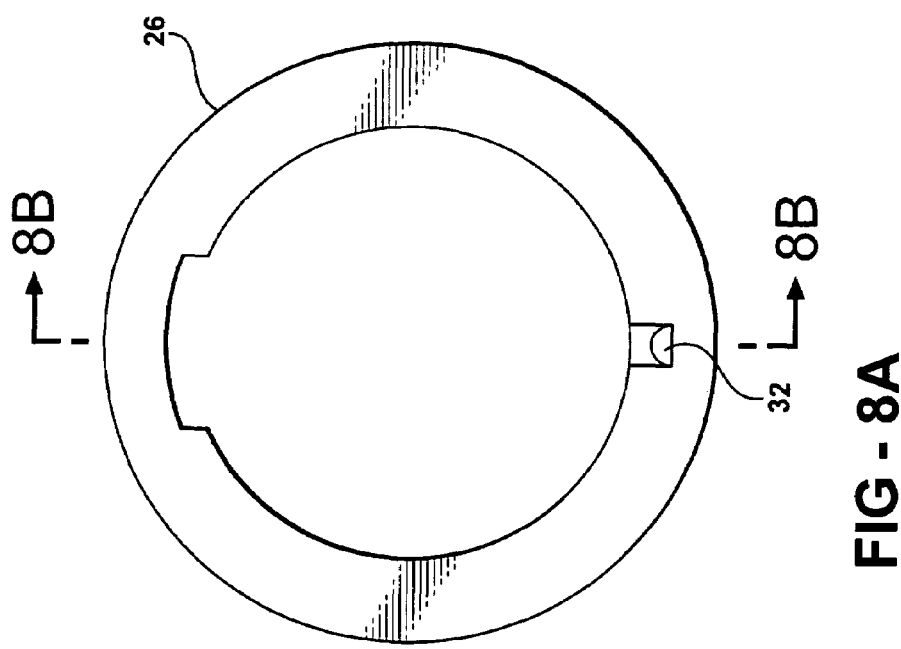

Furthermore, the insert 26 can take many different forms without departing from the spirit of this invention. As an example, FIGS. 8A-8C give three views of an alternative insert configuration which is equally adaptable to these teachings.

Obviously, many modifications and variations of the present invention are possible in light of the above teachings. It is, therefore, to be understood that the invention may be practiced otherwise than as specifically described.

What is claimed is:

1. A dust boot, comprising:
   an annular body defining an interior cavity having a housing opening at one longitudinal end of said dust boot for attaching to a housing, and a shank opening at an opposite longitudinal end of said dust boot for sealingly engaging a shank portion of a ball stud;

an upper boot wall defining an annular end face surrounding said shank opening;

an annular rim seal extending longitudinally outwardly from and along a periphery of said annular end face spaced radially outwardly from said shank opening by said annular end face;

said rim seal having a flexible flap to permit the evacuation of excess grease from within said interior cavity of said dust boot, said rim seal flexing radially outwardly to relieve excess grease;

a continuous, annular wiping lip located on an inner radial face of said upper boot wall in said shank opening;

an annular grease channel bounded circumferentially between said rim seal and said wiping lip and bounded longitudinally between said upper boot wall and a lower channel wall which radially extends between said rim seal and said wiping lip;

an offset opening hole longitudinally extending through said upper boot wall into said grease channel which is radially offset from said wiping lip and which is circumferentially spaced away from said flexible flap; and a chaplet hole longitudinally extending through said lower channel wall into said grease channel which is aligned with said offset opening hole;

wherein excess grease flows from within said interior cavity of said dust boot through said chaplet hole into and around said grease channel and further flows through said offset opening hole and said flexible flap.

2. The dust boot of claim 1, further comprising an insert housed in said upper boot wall, wherein said offset opening hole extends through said insert.

3. The dust boot of claim 2, wherein said insert comprises at least a portion of said grease channel.

4. The dust boot of claim 2, wherein said insert comprises a plastic.

5. The dust boot of claim 4, wherein said plastic comprises nylon.

6. The dust boot of claim 1, wherein said offset opening hole and said flexible flap are substantially opposite one another with respect to their circumferential positions along said grease channel.

7. The dust boot of claim 1, further comprising a rigid ring housed in said dust boot proximate said housing opening.

8. The dust boot of claim 1, wherein said lower channel wall of said grease channel is longitudinally located under an uppermost discontinuous, annular wiping lip.

9. The dust boot of claim 1, comprising a plurality of continuous, annular wiping lips on said inner face.

10. The dust boot of claim 1, wherein said flexible flap is provided by a radially thinned portion of said rim seal.

11. A joint assembly, comprising:
a ball stud having a shank portion and a ball portion;
a housing having a ball stud exit end, said ball portion articulatably engaged in an interior of said housing and said shank portion extending from said housing;
a dust boot attached to said housing at said ball exit end, said dust boot having a shank opening in sealing engagement with said shank portion, and a housing opening in sealing engagement with said housing at said ball stud exit end; said dust boot comprising:

an annular body defining an interior cavity having said housing opening at one longitudinal end of said dust boot for attaching to said housing, and said shank opening at an opposite longitudinal end of said dust boot for sealingly engaging said shank portion of said ball stud;

an upper boot wall defining an annular end face surrounding said shank opening;

an annular rim seal extending longitudinally outwardly from and along a periphery of said annular end face spaced radially outwardly from said shank opening by said annular end face;

said rim seal having a flexible flap to permit the evacuation of excess grease from within said interior cavity of said dust boot, said rim seal flexing radially outwardly to relieve excess grease;

a continuous, annular wiping lip located on an inner radial face of said upper boot wall in said shank opening;

an annular grease channel bounded circumferentially between said rim seal and said wiping lip and bounded longitudinally between said upper boot wall and a lower channel wall which radially extends between said rim seal and said wiping lip;

an offset opening hole longitudinally extending through said upper boot wall into said grease channel which is radially offset from said wiping lip and which is circumferentially spaced away from said flexible flap; and a chaplet hole longitudinally extending through said lower channel wall into said grease channel which is aligned with said offset opening hole;

wherein excess grease flows from within said interior cavity of said dust boot through said chaplet hole into and around said grease channel and further flows through said offset opening hole and said flexible flap.

12. The joint assembly of claim 11, further comprising an insert housed in said upper boot wall, wherein said offset opening hole extends through said insert.

13. The joint assembly of claim 12, wherein said insert comprises at least a portion of said grease channel.

14. The joint assembly of claim 12, wherein said insert comprises a plastic.

15. The joint assembly of claim 14, wherein said plastic comprises nylon.

16. The joint assembly of claim 11, wherein said offset opening hole and said flexible flap are substantially opposite one another with respect to their circumferential positions along said grease channel.

17. The joint assembly of claim 11, further comprising a rigid ring housed in said dust boot proximate said housing opening.

18. The joint assembly of claim 11, wherein said lower channel wall of said grease channel is longitudinally located under an uppermost discontinuous, annular wiping lip.

19. The joint assembly of claim 11, comprising a plurality of continuous, annular wiping lips on said inner face.

20. The joint assembly of claim 11, wherein said flexible flap is provided by a radially thinned portion of said rim seal.

* * * * *